United States Patent [19]

Ishikawa et al.

[11] Patent Number: 5,452,050
[45] Date of Patent: Sep. 19, 1995

[54] IMAGE PRINTER

[75] Inventors: Masazumi Ishikawa; Toru Tanibata, both of Wakayama, Japan

[73] Assignee: Noritsu Koki Co., Ltd., Japan

[21] Appl. No.: 252,726

[22] Filed: Jun. 2, 1994

[30] Foreign Application Priority Data

Jun. 3, 1993 [JP] Japan .................................. 5-133605
Jun. 14, 1993 [JP] Japan .................................. 5-141624
Jun. 14, 1993 [JP] Japan .................................. 5-141743

[51] Int. Cl.⁶ ...................... G03B 27/32; G03B 27/52; G03B 27/44
[52] U.S. Cl. ............................................. 355/27; 355/46
[58] Field of Search .................. 355/27, 28, 46, 54

[56] References Cited

U.S. PATENT DOCUMENTS

| 4,843,430 | 6/1989 | Huber et al. | 355/27 |
| 5,041,853 | 8/1991 | Kiejzik | 354/88 |
| 5,162,842 | 11/1992 | Shiota | 355/40 |
| 5,214,469 | 5/1993 | Klocke et al. | 355/45 |

FOREIGN PATENT DOCUMENTS 0296080 12/1988 France .
2539304 5/1976 Germany .

OTHER PUBLICATIONS

Patent Abstracts of Japan vol. 9, No. 327 (P–415) 21 Dec. 1985 & JP-A-60 151 640 (Konishiroku Shashin Kogyo KK) 9 Aug. 1985 * abstract *.
Patent Abstracts of Japan vol. 14, No. 574 (P–1145) 20 Dec. 1980 & JP-A-02 245 751 (Fuji Photo Film Co Ltd) 1 Oct. 1990 * abstract *.

*Primary Examiner*—Richard A. Wintercorn
*Attorney, Agent, or Firm*—Townsend and Townsend Khourie and Crew

[57] ABSTRACT

An image printer includes a developing unit for developing an exposed photosensitive material, a plurality of transport members for transporting a photosensitive material to the developing unit through exposing positions provided respectively in a plurality of photosensitive-material transport passages arranged in parallel to each other, and a plurality of projection exposure units for exposing a film image on to the photosensitive material. The projection units are provided respectively for the exposing positions of the transport members.

18 Claims, 15 Drawing Sheets

IMAGE PRINTER

BACKGROUND OF THE INVENTION

1. Field of the Invention

The present invention relates to an image printer.

2. Description of the Related Art

As an image printer for exposing a film image on to a photosensitive material, there is well-known an image printer having a projection exposure unit for projecting and exposing the film image on to the photosensitive material and a developing unit for developing the photosensitive material exposed at the projection exposure unit.

This type of image printer further includes transport means for transporting the photosensitive material through an exposing position of the projection exposure unit to the developing unit. In operation, the photosensitive material, as being transported by this transport means, undergoes a series of processes from the exposure process of the film image to the developing process.

According to the above-described conventional construction, however, the image printer has only one projection exposure unit and also only one transport means for transporting the photosensitive material through the projection exposure unit. Hence, for increasing the film exposure processing capacity, it has been necessary for a user to purchase a plurality of units of the image printers of the same kind. Therefore, a large space has been needed for installation of the printers.

The present invention attends to the above-described problem. And, a primary object of the present invention is to improve the film-image exposure processing capacity of the image printer while restricting increase of its installment space.

SUMMARY OF THE INVENTION

For achieving the above-noted object, an image printer, according to the characterizing features of an image printer of the present invention, comprises:

a plurality of transport means for transporting a photosensitive material to a developing unit through exposing positions provided respectively in a plurality of photosensitive-material transport passages arranged in parallel to each other; and a plurality of projection exposure means for exposing a film image on to the photosensitive material, the projection means being provided respectively for the exposing positions of the transport means.

According to the above-described construction, the photosensitive material transported to the exposing position by the respective transport means is exposed by the projection exposure means provided at each exposing position. With completion of the exposure at the exposing position, this photosensitive material is further transported by the transport means to the developing unit to be developed thereby.

The plurality of transport means for transporting the photosensitive material in the above-described manner has their photosensitive material transport passages arranged in parallel to each other. This construction has the advantage of restricting volume increase of the apparatus body, in comparison with a further conceivable arrangement in which a plurality of photosensitive material transport passages provided for the same purpose of providing a plurality of transport means and a plurality of exposing positions are disposed to cross each other.

As a result, since the transport means and the exposing positions of the transport means are provided in pluralities, it becomes possible to improve the exposure processing capacity of the image printer and also to eliminate time loss due to interruption of an exposure processing in the case of printing of characters, change of the photosensitive material, making copy prints or the like. Moreover, with the possibility of the restriction of the volume increase of the apparatus body, the improvement of the exposure processing capacity of the image printer may be realized.

According to one aspect of the present invention, the plurality of the transport means are disposed side by side in the horizontal direction.

With this construction, since the plurality of the transport means are disposed side by side in the horizontal direction, it becomes possible to restrict increase of the height of the apparatus body in providing the plurality of transport means and the plurality of the exposing positions.

As a result, with the restriction of the increase of the height of the apparatus body, this construction will be particularly convenient in case there is a height limit at a site where the apparatus is to be installed.

According to a further aspect of the present invention, the plurality of transport means are disposed one above another in the vertical direction.

With this construction, since the plurality of the transport means are disposed one above another in the vertical direction, it becomes possible to restrict increase of the horizontal occupying area of the apparatus body in providing the plurality of transport means and the plurality of the exposing positions.

As a result, with the restriction of the increase of the horizontal occupying area of the apparatus body, this construction will be particularly convenient in case there is a limit of an occupying area at a site where the apparatus is to be installed.

According to a still further aspect of the present invention, at least one of the plurality of the transport means is adapted to transport the photosensitive material through the plurality of exposing positions, and each of the exposing positions is provided with the projection exposure unit for projecting and exposing the film image and with an image projection unit for exposing the film image with this image being divided into a plurality of areas.

With the above-described construction, at least one of the plurality of transport means transports the photosensitive material through the plurality of exposing positions, so that a same single portion of the photosensitive material may be exposed at the plurality of exposing positions.

Further, each of these exposing positions is provided with the projection exposure unit for projecting exposing the film image and the image exposure unit for exposing the film image with this image being divided into a plurality of areas. Accordingly, while it is of course possible to expose the photosensitive material only at either one of the projection exposure unit and the image exposure unit, it is also possible to effect a so-called multiple exposure by using both of the exposure units.

As a result, with the possibility of the multiple exposure processing at a plurality of exposing positions, it becomes possible to diversify the applications of the image printer thereby to increase the convenience of the image printer.

According to a still further aspect of the present invention, an image printer comprises:

a plurality of transport means for transporting a photosensitive material to a developing unit through exposing positions provided respectively in a plurality of photosensitive-material transport passages arranged in parallel to each other; and a plurality of projection exposure means for exposing a film image on to the photosensitive material, the projection means being provided respectively for the exposing positions of the transport means;

wherein the developing unit includes a plurality of transport passages for independently transporting the photosensitive material fed by each of the plurality of transport means.

With the above-described construction, the photosensitive materials transported by the respective transport means are exposed with the film image by the projection exposure means provided to the respective exposing positions. Then, upon completion of the exposures at the exposing positions, the photosensitive materials from the respective transport means are sent to the developing unit and developed thereby while the photosensitive materials are being transported independently by the plurality of transport passages.

As described above, with the plurality of the transport means and the plurality of projection exposure means, if the printer is provided with two units of transport means, it is possible to use one transport means and the corresponding exposing position for the purpose of a simultaneous printing operation while using the other transport means and its corresponding exposing position for the further purpose of a reprinting operation. In this manner, it is possible to effect, on one hand, a simultaneous printing operation at its original high speed while effecting a reprinting operation on the other hand.

Further, in the case of providing two units of transport means, it is also possible to use one transport means and its corresponding exposing position for an exposure processing of a film of a widely used size (e.g. 135 film) while using the other transport means and its corresponding exposing position for a further exposure processing of a film of a different size. In this manner, it is possible to efficiently effect an exposure operation of a film of a popular size while effecting an exposure operation of a film of an un-popular size. Moreover, since the developing unit includes a plurality of transport passages for independently transporting the photosensitive materials from the respective transport means, exposure operations may be effected without time delay even if a large number of photosensitive materials are supplied from the plurality of transport means.

In short, by providing the plurality of transport means and the plurality of projection exposure means, it is possible for the printer to effect an exposure operation which is required by a large amount and to separately effect a further exposure operation which is required by a small amount but which requires a lot of trouble. Further, these separately exposed photosensitive materials may be developed without time delay as being independently transported along the plurality of transport passages.

As a result, with the provision of the plurality of transport means and the plurality of projection exposure means, the printer can effect an exposure operation which is required by a large amount and to separately effect a further exposure operation which is required by a small amount but which requires a lot of trouble. And, these separately exposed photosensitive materials may be developed without time delay as being independently transported along the plurality of transport passages. Therefore, the printer provides improved processing capacity while effecting various kinds of exposure operations.

According to a still further aspect of the present invention, only one of the plurality of the transport means is connected with the film developing unit for developing and feeding the film.

With this construction, the transport means to which the film developing unit is connected may be employed for a simultaneous printing operation while the other transport means to which the film developing unit is not connected may be employed for reprinting operations. Thus, the simultaneous printing operation and the reprinting operation may be effected with simplification of the construction.

As a result, with the reduction in the number of the film developing units for the simplification of the apparatus construction, the simultaneous printing operation and the reprinting operation may be effected in an efficient manner.

According to a still further aspect of the present invention, the respective transport means are adapted to transport photosensitive materials having different widths in the direction normal to the transporting direction.

With this construction, one of the plurality of transport means may transport a photosensitive material having a width which is often used in a simultaneous printing operation while the other transport means may transport a further photosensitive material having a width which is often used in the case of a reprinting operation for example, whereby the operations may be effected without the trouble of exchange of the photosensitive material.

As a result, since the operations may be effected without the trouble of exchange of the photosensitive material, further improvement in the operation efficiency has become possible.

According to a still further aspect of the present invention, the image printer further comprises a magazine for housing the photosensitive materials and photosensitive-material feed means for feeding and distributing the photosensitive materials housed in the magazine to the plurality of transport means.

With the above-described construction, the photosensitive materials housed in the single magazine may be distributed and fed to the plurality of transport means.

As a result, with the possibility of distributing and transporting the photosensitive materials housed in the single magazine to the plurality of transport means, in comparison with a further conceivable construction using a plurality of magazines, it is possible to form the construction compact and also to facilitate e.g. management of remaining amounts of the photosensitive materials. Thus, the printer having this construction will be more convenient.

According to a still further aspect of the present invention, the plurality of transport means for transporting the photosensitive materials through the exposing positions to the developing unit include the photosensitive-material transport passages disposed side by side in a common plane; and one image exposure unit for exposing the photosensitive material with dividing the image information into a plurality of areas is adapted to expose the plurality of photosensitive materials transported by the plurality of transport means.

With this construction, the plurality of transport means transport the photosensitive materials to the developing unit along the photosensitive-material transport passages disposed side by side in a common plane.

And, at the exposing position provided in the course of the transport, one image exposure unit exposes the plurality of photosensitive materials transported by the plurality of transport means.

That is to say, there are provided the plurality of transport means and also the plurality of the photosensitive materials transported by these respective transport means too will be disposed in parallel to each other within the common plane.

Then, for exposing these photosensitive materials, the single image exposure unit is provided. Accordingly, the image exposure unit may expose the photosensitive materials regardless of the widths of these photosensitive materials transported by the plurality of transport means.

That is to say, even in case a plurality of photosensitive materials having a same width in the direction normal to the transporting direction of the photosensitive-material transport passages transported in parallel to each other and an exposure is to be effected on these photosensitive materials, or even in case an exposure is to be effected on a plurality of photosensitive materials having different widths and transported in parallel to each other, the image exposure unit is capable of exposing these photosensitive materials as long as the widths stay within the width limit which may be coped with by the image exposure unit.

Consequently, by using photosensitive materials of a same width to be transported by the plurality of transport means, the exposure processing capacity of the printer may be improved. And, it is also possible for the plurality of transport means to transport photosensitive materials of different widths. Therefore, the image printer provided with the abovedescribed construction achieves both the improvement of the exposure processing capacity and the possibility of coping with a plurality of kinds of photosensitive materials having widths different from each other.

According to a still further aspect of the present invention, the image exposure unit is adapted to effect the exposure of the image information with diving the image information into a plurality of lines extending normal to the transporting direction of the photosensitive-material transport passages.

With the above-described construction, the image exposure unit exposes the photosensitive material with dividing the two-dimensional image information into a plurality of lines extending normal to the transporting direction of the photosensitive-material transport passages. In other words, the divided lines of image information are exposed one after another in association with the relative movement between the photosensitive material and the image exposure unit.

As a result, since the image information as divided into a plurality of areas is exposed at one time onto the photosensitive material, the construction of the image exposure unit may be simple and compact, thereby to contribute to the reduction of the costs and the size of the entire image printer.

According to a still further aspect of the present invention, the plurality of transport means are rendered switchable between a state for independently transporting a plurality of photosensitive materials and a further state for together transporting a single photosensitive material.

With the above-described construction, the plurality of transport means selectively provide one operation condition for independently transporting a plurality of photosensitive materials so that the single image exposure unit exposes the photosensitive materials at the exposing position of each transport means and the further operation condition for cooperating to transport a single photosensitive material so that the single image exposure unit exposes the single photosensitive material.

Therefore, the image printer may selectively provide the two kinds of operation mode, i.e. the condition for exposing a plurality of kinds of image information onto a plurality of photosensitive materials and the further condition for exposing one kind of image information onto a single photosensitive material having a width transported by the plurality of transported means, i.e. a so-called enlarging operation mode.

As a result, with the possibility of exposure of plurality of photosensitive materials and also of the enlarging exposure mode, the image printer having this construction will be even mope convenient.

According to a still further aspect of the present invention, the plurality of transport means are adapted to transport photosensitive materials having different widths.

With the above-described construction, the plurality of transport means are capable of transporting photosensitive materials having widths different from each other, so that the image information may be exposed in a variety of magnifications.

As a result, with the possibility of the exposure in a variety of magnifications, the image printer having this construction will be even more convenient.

According to a still further aspect of the present invention, the image printer further comprises a magazine for housing the photosensitive materials and photosensitive-material feed means for feeding and distributing the photosensitive materials housed in the magazine to the plurality of transport means.

With the above-described construction, since the plurality of transport means commonly use the same magazine, the construction of the image printer may be more simple.

According to a still further aspect of the present invention, the image printer further comprises a plurality of reader means for reading the image information to be respectively exposed at the exposing positions of the plurality of transport means.

With the above-described construction, after the plurality of reader means read the image information; then, based on the image information, the photosensitive materials are exposed respectively at the exposing positions of the plurality of transport means.

As a result, with the provision of the plurality of reader means for the respective exposures at the exposing positions of the plurality of transport means, it is possible to reduce the time period required by the image exposure unit to obtain the image information to be exposed, thereby to allow the exposure of the image information at the image exposure unit to be effected in an efficient manner. Moreover, if the plurality of reader means are adapted to read different sizes of image information, a variety of manners of reading of the image information too becomes possible.

Further and other objects, features and effects of the invention will become apparent from the following more detailed description of the embodiments of the invention with reference to the accompanying drawings.

DESCRIPTION OF THE PREFERRED EMBODIMENTS

Next, preferred embodiments of an image printer relating to the present invention will be described in particular with reference to the accompanying drawings.

Figure 1:
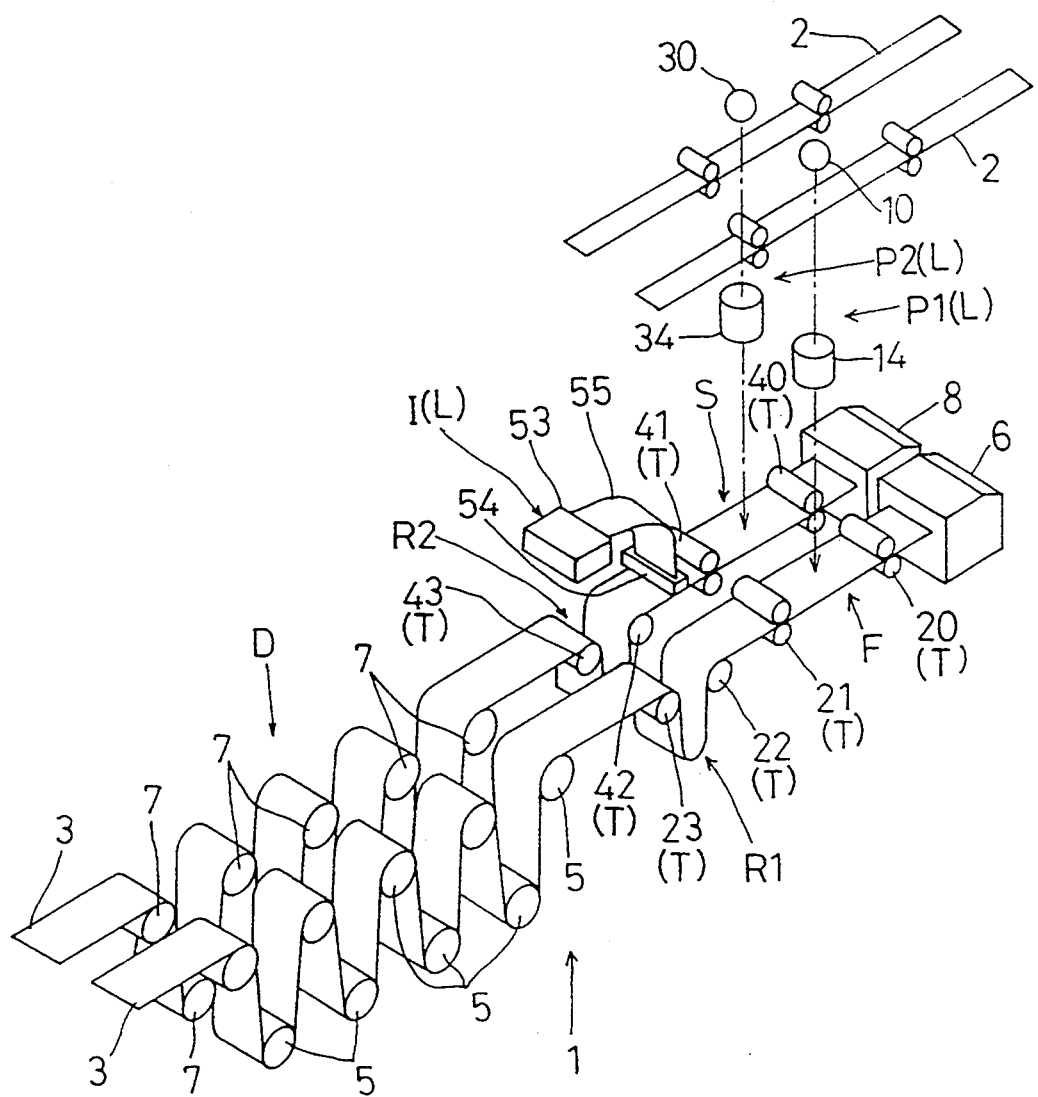
FIG. 1 is a perspective view showing a schematic construction relating to one preferred embodiment of the present invention.

As shown in FIG. 1, an image printer 1 includes a first exposure unit F and a second exposure unit S disposed in parallel to each other in the horizontal direction; and also transport passages for print papers 3 as photosensitive materials too are disposed side by side in the horizontal direction. Incidentally, for the purpose of visual clarity, some of the components are eliminated from the view in FIG. 1.

The first exposure unit F comprises an exposure unit for effecting only projection and exposure of an image of a film 2 on to the print paper 3. And, this exposure unit includes a first projection exposure unit P1 for projecting and exposing the image of the film 2 on to the print paper 3, a developing unit D for developing the exposed print paper 3, and a first loop forming unit R1 for forming a loop of the print paper 3 in order to adjust a difference in the processing speeds of the first projection exposure unit P1 and of the developing unit D.

The second exposure unit S comprises an exposure unit capable of effecting a so-called multiple exposure. This second exposure unit S includes a second projection exposure unit P2 for projecting and exposing the image of the film 2 onto the print paper 3, an image exposure unit I for exposing image information onto the print paper 3 with dividing the information into a large number of areas, a developing unit D for developing the exposed print paper 3, and a second loop forming unit R2 for forming a loop of the print paper 3 in order to adjust a difference in the processing speeds of the second projection exposure unit P2 and of the developing unit D.

The developing unit D of the first exposure unit F and the developing unit D of the second exposure unit S shares a same developing tank 4. But, in these units D, D, transporting operations of the print paper 3 are carried out independently of each other.

Operations of both the first exposure unit F and of the second exposure unit S are controlled in accordance with a control scheme of a controller C.

Next, the respective components of the first exposure unit F will be specifically described.

Figure 2:
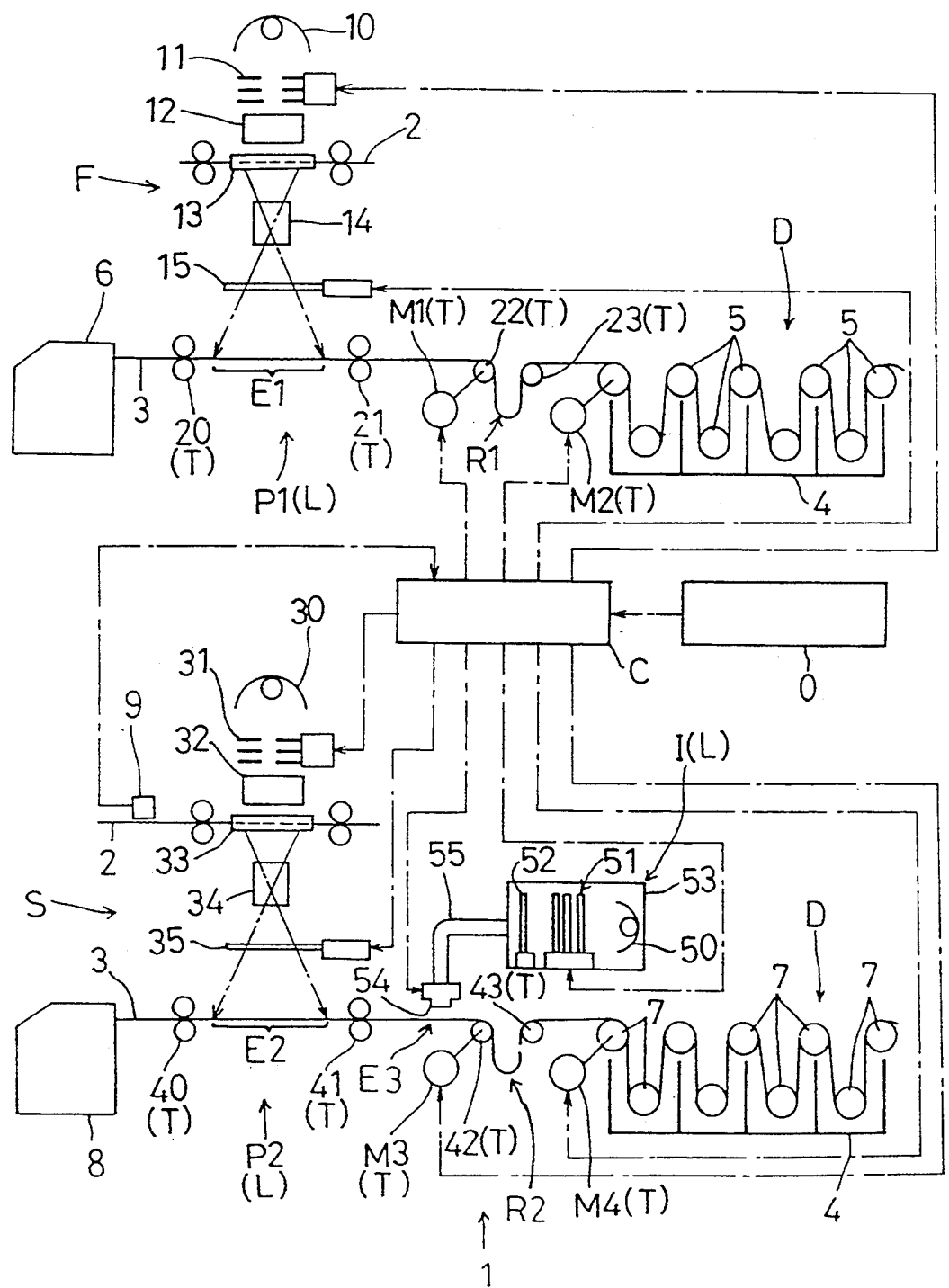
FIG. 2 is a schematic construction view of the embodiment of FIG. 1.

The first projection exposure unit P1, as shown in FIG. 2, includes a light source 10, a light modulating filter 11 for adjusting color balance of light beam from the light source 10, a mirror tunnel 12 for uniformly mixing the color components of the light having passed through the light modulating filter 11, a negative mask 13 for holding the film 2, a printing lens 14 for forming the image of the film 2 on the print paper 3 and a shutter 15, with these components being arranged along a same optical path.

An exposing position E1 of the first projection exposure unit P1 comprises the position where the printing lens 14 forms the image of the film 2. On the upstream and downstream sides of this exposing position E1 in the transport passage of the print paper 3, there are disposed rollers 20, 21 for transporting the print paper 3. These rollers 20, 21, together with a further roller 22 to be described later, are connected to each other via an unillustrated belt to be driven together by means of a motor M1.

In the first projection exposure unit P1, with a frame of the film to be exposed being located within the negative mask 13, projection and exposure is effected onto the print paper 3 while the controller C controls operations of the light modulating filter 11 and the shutter 15 to as to obtain an exposure amount determined in accordance with e.g. density information of the particular film frame. With completion of the exposure, the controller C activates the motor M1 to withdraw the print paper 3 from a print-paper magazine 6 and to transport the print paper 3 until an unexposed portion comes to the exposing position E1.

The first loop forming unit R1 is adapted to form a loop of the print paper 3, as shown in FIG. 2, between the rollers 22, 23 on the downstream side of the print paper transporting passage. In particular, a large loop is formed when a transporting speed of the print paper 3 at the developing unit D is lower than a transporting speed of the print paper 3 on the upstream side of the transport passage relative to the roller 22 and a small loop is formed in the opposite situation, thereby to absorb the difference between the transporting speeds.

The developing unit D of the first exposure unit F includes four developing tanks 4 and rollers 5. The rollers 5 are operatively connected with the abovedescribed roller 23 through an unillustrated belt to be driven together by means of a motor M2.

In the developing unit D of the first exposure unit F, as the exposed print paper 3 is transported through the first loop forming unit R1, this print paper 3 is developed in the course of its successive passages through the four developing tanks 4.

The developed print paper 3 is cut into pieces by means of an unillustrated cutter.

Next, the respective components of the second exposure unit S will be specifically described.

The second projection exposure unit P2 has the same construction as the first projection exposure unit P1 of the first exposure unit F and includes, as shown in FIG. 2, a light source 30, a light modulating filter 31, a mirror tunnel 32, a negative mask 33, a printing lens 34, and a shutter 35, with these components being aligned on a same optical path.

On the upstream and downstream sides of an exposing position E2 in the transport passage of the print paper 3 at which position the printing lens 34 forms the image of the film 2, there are disposed rollers 40, 41 for transporting the print paper 3. These rollers 40, 41, together with a further roller 42 to be described later, are connected to each other via an unillustrated belt to be driven together by means of a motor M3.

In the vicinity of the negative mask 33, there are provided a CCD line sensor and a color filter. There is also provided an image sensor 9 for detecting image information of the film 2 with the image being divided into a number of areas and resolved into the three primary color components of red, blue and green.

The exposing function of the second projection exposure unit P2 is same as that of the first projection exposure unit P1. That is, this unit effects projection and exposure of the image of the film 2 onto the print paper 3 having been withdrawn from the print-paper magazine 8.

The image exposure unit I includes a light-source unit 53 housing a light source 50, a color filter 51 and a shutter 52 within one casing, a PLZT print head 54, an optical fiber bundle 55 for guiding light beam between the light-source unit 53 and the PLZT print head 54.

The PLZT print head 54, though not shown, includes a great number of assemblies each having a PLZT interposed between a polarizer and an analyzer, with the assemblies being linearly disposed in the direction perpendicular to the transporting direction of the print paper 3. In operation, by varying a voltage to be impressed between a pair of electrodes attached to each PLZT, the polarizing direction of the light beam passing between the electrodes is changed, so that each PLZT functions as a light shutter for allowing or inhibiting the light passage.

For exposing the print paper 3 in the image exposure unit I, by switching over the color filter 51 of the light-source unit 53, the color of the light irradiated from the light-source unit 53 is switched to one of the three colors of red, blue and green; and with each color the light shutters of the PLZT print head 54 are opened and closed to expose the print paper 3. Since this PLZT print head 54 comprises the linearly arranged light shutters, the print head can expose only one line amount of the image information. Thus, for exposing the entire two-dimensional image information, the exposure is effected while the motor M3 is activated to continuously transport the print paper 3 to the exposing position E3.

The transporting operation of the print paper 3 and the opening/closing operations of the light shutters of the PLZT print head 54 based on the image information to be exposed are all controlled by the controller C.

The portion of the print paper 3 to be exposed at the image exposure unit I is not an un-exposed portion. Rather, in this unit, a so-called multiple exposure operation is effected to expose the portion once exposed at the second projection exposure unit P2 in an overlapping manner. The image information to be exposed at the image exposure unit I comprises image information of the film 2 read by the image sensor 9 and having its contrast or color corrected, or further image information produced by means of a computer graphics or the like.

The second loop forming unit R2 functions to form a loop of the print paper 3, as shown in FIG. 2, on the downstream side of the print paper transport passage between the roller 42 and the roller 43. Then, like the first loop forming unit R1, the second loop forming unit serves to absorb a difference between a transport speed of the print paper 3 at the developing unit D and a transport speed of the print paper 3 on the upstream side of the print paper transport passage.

The developing unit D of the second exposure unit S includes the same four developing tanks 4 as shared by the developing unit D of the first exposure unit F and rollers 7. The rollers 7 are operatively connected with the above-described roller 43 via an unillustrated belt to be driven together by means of a motor M4.

In the developing unit D of the second exposure unit S, as the exposed print paper 3 is transported through the second loop forming unit R2, this print paper 3 is developed in the course of its successive passages through the same four developing tanks 4.

The developed print paper 3 is cut into pieces by means of an unillustrated cutter.

Next, general functions of the image printer 1 having the above-described construction will be described.

In case the image of the film 2 is to be exposed by the projection exposure process, the film 2 is inserted into the negative mask 13 of the first projection exposure unit P1; and an instruction is inputted from a control panel 0 to instruct an exposure operation in the first exposure unit F.

With the above input of the instruction, the controller C controls the operations of the respective components for projecting and exposing the image of the film 2 on to the print paper 3 at the exposing position E1, developing the exposed paper, cutting the paper into separate photograph sheets and then discharging the sheets from the system, in the abovedescribed manners.

In case a multiple exposure operation is to be effected based on the image of the film 2, the film 2 is set to the position of the image sensor 9 of the second projection exposure unit P2; and then an instruction is inputted from the control panel 0 to instruct an exposure operation to be effected at the second exposure unit S.

With the above input of the instruction, the controller C controls the operations of the respective components for first causing the image sensor 9 to detect the image information of the film and then causing projection and exposure of the image of the film 2 to be effected at the exposing position E2 where the printing lens 34 forms the image of the film 2. Upon completion of the projection and exposure, the print paper 3 is transported by the drive of the motor M3 to the exposing position E3 of the image exposure unit I facing the PLZT print head 54. Then, the print paper 3 is exposed with exposure image information comprising the image information read by the image sensor 9 with treatment of e.g. contrast correction, or with any other image information produced depending on the necessity. After the development, the print paper 3 is cut into separate photograph sheets and discharged as such from the system.

It is of course possible to effect the exposure at the first exposure unit F and the exposure of the second exposure unit S simultaneously. Further, in the second exposure unit S, it is possible to effect the exposure only at either one of the second projection exposure unit P2 and the image exposure unit I. Switching-over operations of these operation modes are all effected by input operations from the control panel 0.

Accordingly, the rollers 20, 21, 22, 23, the motors M1, M2, the rollers 40, 41, 42, 43 and the motors M3, M4 together function as transport means T for transporting the print papers 3 through the exposing positions E1, E2, E3 to the developing units D.

The first projection exposure unit P1, the second projection exposure unit P2 and the image exposure unit I together function as projection exposure means L for exposing the image of the film 2 onto the print papers 3.

Next, other embodiments will be described.

(1) In the foregoing embodiment, the transport means T are arranged side by side in the horizontal direction. Instead, these transport means T may be vertically arranged with placing the first exposure unit F and the second exposure unit S one above the other.

(2) In the foregoing embodiment, the developing units D are constructed so that the print papers 3 are transported and developed independently of each other at the first exposure unit F and the second exposure unit S. Instead, the developing unit D may be constructed to transport only one line of print paper 3, with the print paper 3 exposed by the first exposure unit F and the print paper 3 exposed by the second exposure unit S being switched over at the entrance of the developing unit D to be transported into the same.

(3) In the foregoing embodiment, the first exposure unit F includes one exposing position for effecting the projection exposure while the second exposure unit S includes one exposing position for effecting the projection exposure and the further exposing position for the exposure by the PLZT print head 54. In place of this, the first exposure unit F too may be provided with an exposing position for the exposure by the PLZT print head 54, so that the multiple exposure operation may be carried out not only at the second exposure unit S but also at the first exposure unit F.

(4) A still further embodiment will be described next.

Figure 3:
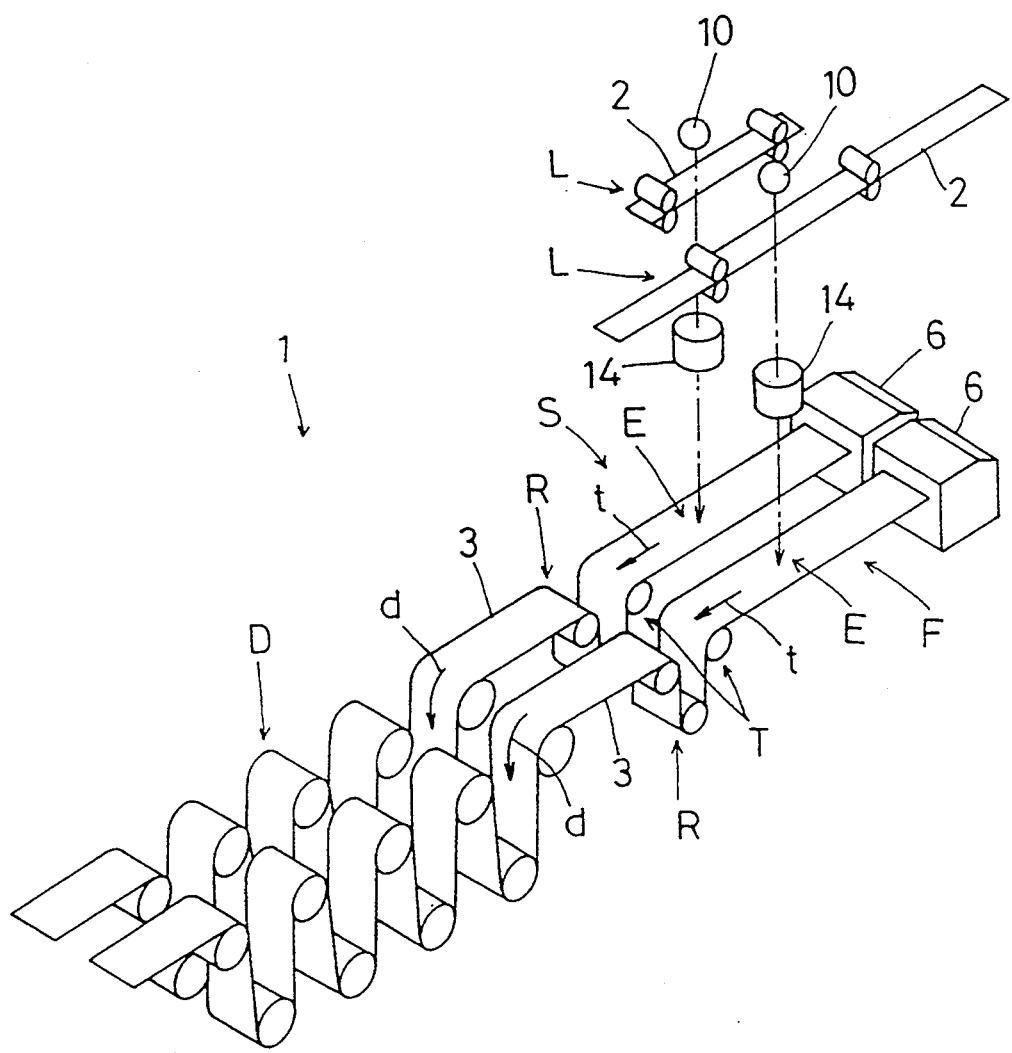
FIG. 3 is a perspective view showing major portions of a further embodiment.

As shown in FIG. 3, an image printer 1 includes a first exposure unit F and a second exposure unit S disposed side by side. Incidentally, for the purpose of visual clarity, some of the components are eliminated from the view in FIG. 3.

The first exposure unit F and the second exposure unit S function respectively for effecting projection and exposure of an image of a film 2 on to the print paper 3.

Further, transport means T for transporting the print paper 3 through exposing positions E to a developing unit D are provided with their transport passages (t) arranged side by side in correspondence with the respective exposure units F, S; and projection exposure means L are provided for the respective exposing positions E of the respective transport means T.

Incidentally, in the photosensitive-material transport passage (t) of each transport means T, there is provided a loop forming unit R for forming a loop of the print paper 3 in order to adjust a difference between the projection exposure speed and the processing speed of the developing unit D.

Figure 4:
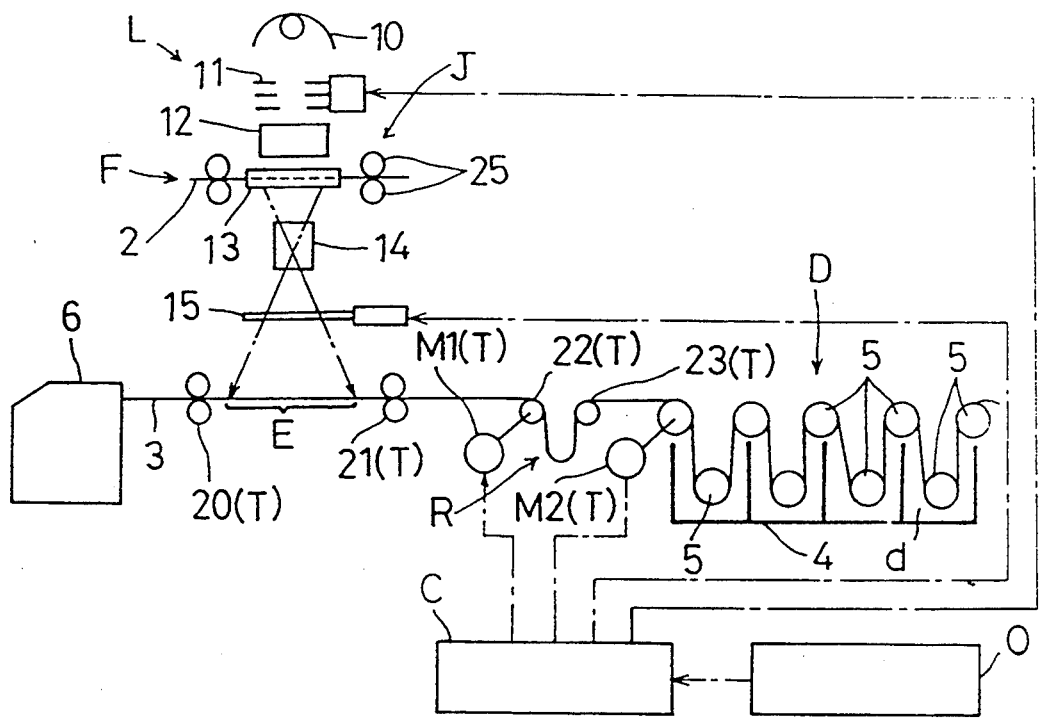
FIG. 4 is a schematic construction view of the embodiment of FIG. 3.

As shown also in FIG. 4, the developing unit D includes, inside the developing tank 4, two transport passages (d) for independently transporting the photosensitive materials transported from the respective transport means T.

Operations of both the first exposure unit F and of the second exposure unit S are controlled in accordance with a control scheme of a controller C.

The first exposure unit F is used for a so-called simultaneous printing operation for continuously exposing a film having a plurality of frames immediately after development thereof. The second exposure unit S is used for a so-called reprinting operation for again effecting exposure for e.g. reprinting after such simultaneous printing operation is effected. Since the basic constructions of these units are the same, the respective components will be described next by taking the first exposure unit F for example.

The projection exposure means L, as shown in FIG. 4, includes a light source 10, a light modulating filter 11 for adjusting color balance of light beam from the light source 10, a mirror tunnel 12 for uniformly mixing the color components of the light having passed through the light modulating filter 11, a negative mask 13 for holding the film 2, a printing lens 14 for forming the image of the film 2 on the print paper 3 and a shutter 15, with these components being arranged along a same optical path.

An exposing position E of the transport means T comprises the position where the printing lens 14 forms the image of the film 2. On the upstream and downstream sides of this exposing position E in the transport passage of the print paper 3, there are disposed rollers 20, 21 for transporting the print paper 3. These rollers 20, 21, together with a further roller 22 to be described later, are connected to each other via an unillustrated belt to be driven together by means of a motor M1.

In the projection exposure means L, with a frame of the film to be exposed being located within the negative mask 13, projection and exposure is effected onto the print paper 3 while the controller C controls operations of the light modulating filter 11 and the shutter 18 to as to obtain an exposure amount determined in accordance with e.g. density information of the particular film frame. With completion of the exposure, the controller C activates the motor M1 to withdraw the print paper 3 from a print-paper magazine 6 and to transport the print paper 3 until an unexposed portion comes to the exposing position E.

The loop forming unit R is adapted to form a loop of the print paper 3, as shown in FIG. 4, between the rollers 22, 23 on the down side of the print paper transporting passage. In particular, a large loop is formed when a transporting speed of the print paper 3 at the developing unit D is lower than a transporting speed of the print paper 3 on the upstream side of the transport passage relative to the roller 22 and a small loop is formed in the opposite situation, thereby to absorb the difference between the transporting speeds.

The developing unit D includes four developing tanks 4 and rollers 5. The rollers 5 are operatively connected with the above-described roller 23 through an unillustrated belt to be driven together by means of a motor M2.

In the developing unit D, as the exposed print paper 3 is transported through the loop forming unit R, this print paper is developed in the course of its successive passages through the four tanks 4.

The developed print paper 3 is cut into pieces by means of an unillustrated cutter.

Figure 5:
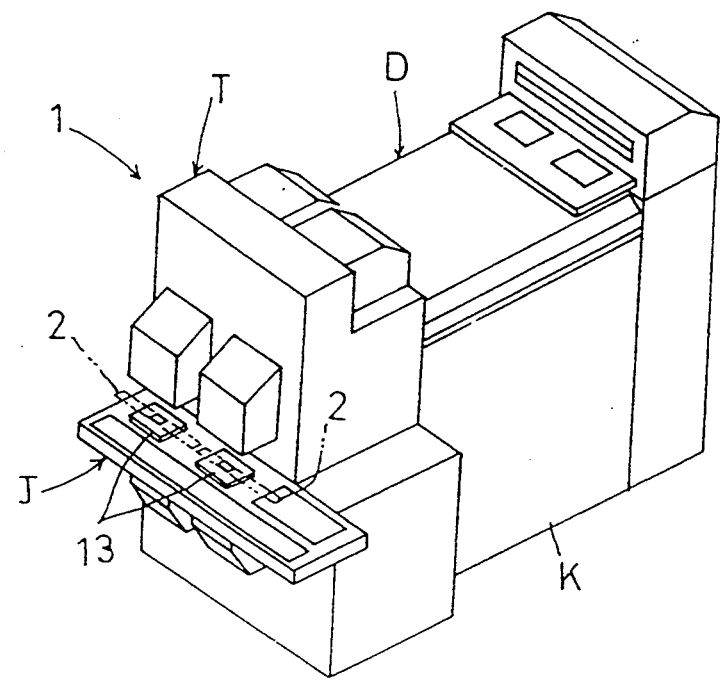
FIG. 5 is a perspective view showing an outer appearance of the embodiment of FIG. 3.

As shown in FIG. 5, with this image printer 1, the components such as the transport means T and the developing unit D are accommodated inside a casing K. And, to a front face of this casing K, there is provided a charging portion J for the film 2. Incidentally, the charging portion J is provided with film transport rollers 25 (see FIG. 3).

Next, general functions of the image printer 1 having the above-described construction will be described.

In case the image of the film 2 is to be exposed by the first exposure unit F, the film 2 is inserted into the negative mask 13 of the projection exposure means L; and an instruction is inputted from a control panel O to instruct an exposure operation in the first exposure unit F.

With the above input of the instruction, the controller C controls the operations of the respective components for projecting and exposing the image of the film 2 on to the print paper 3 at the exposing position E, developing the exposed paper, cutting the paper into separate photograph sheets and then discharging the sheets from the system, in the abovedescribed manners.

It is of course possible to effect the exposure at the first exposure unit F and the exposure of the second exposure unit S simultaneously. And, all these operations are effected by instruction input operations from the control panel 0.

Figure 6:
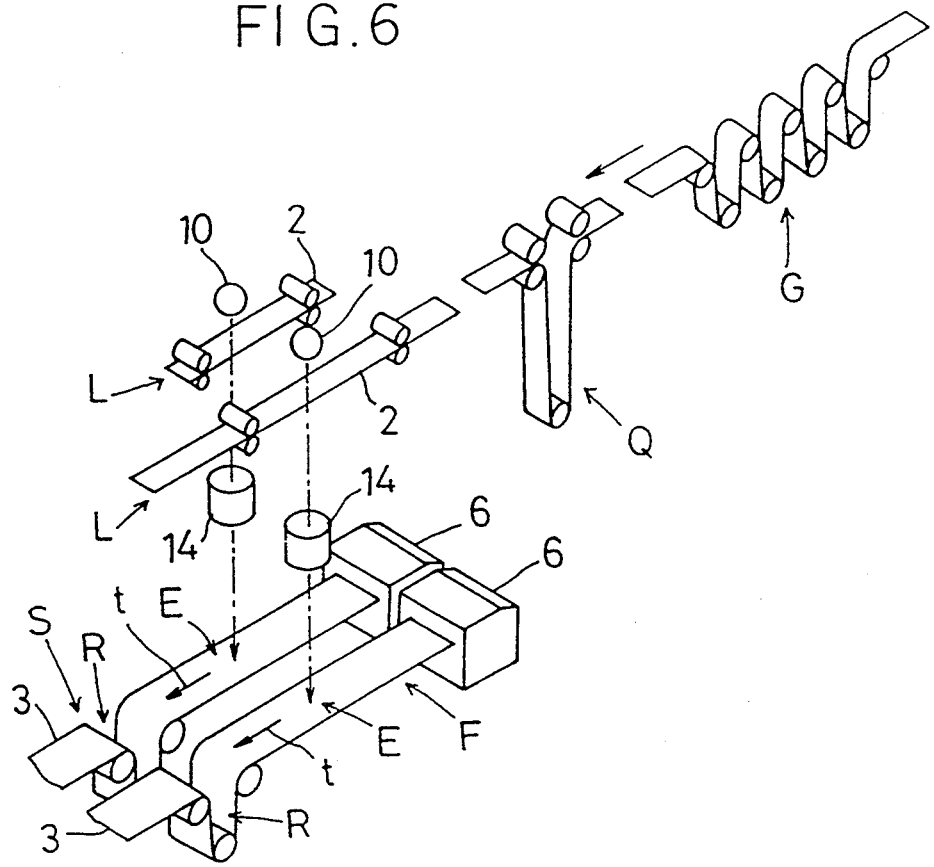
FIG. 6 is a perspective view of major portions relating to a still further embodiment.
Figure 7:
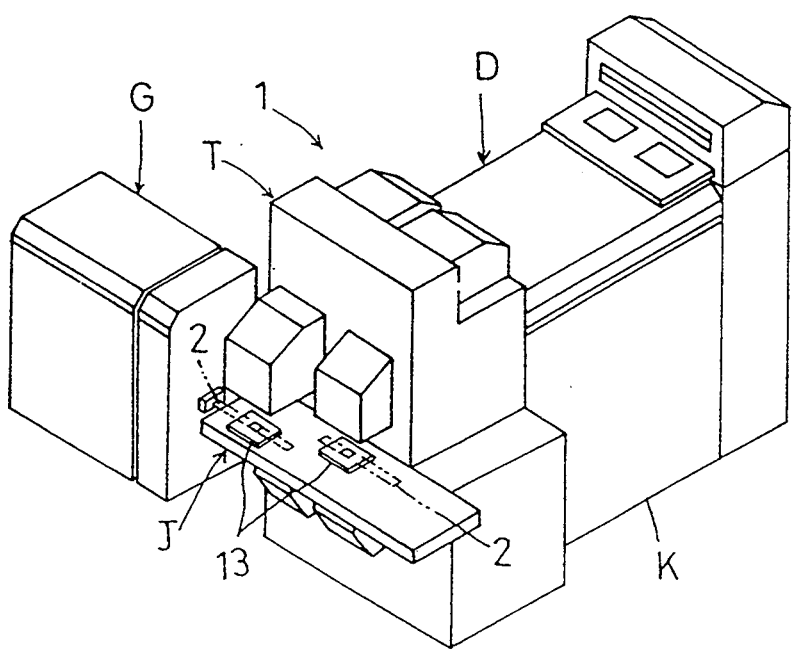
FIG. 7 is a perspective view showing an outer appearance of the embodiment of FIG. 6.

(5) As shown in FIGS. 6 and 7, it is conceivable to connect only the transport means T of the first exposure unit F with the film developing unit G for developing and feeding the film 2. Incidentally, in this figure, a reference mark Q denotes a loop forming unit for the film 2 constructed in the same manner as the loop forming unit R.

Figure 8:
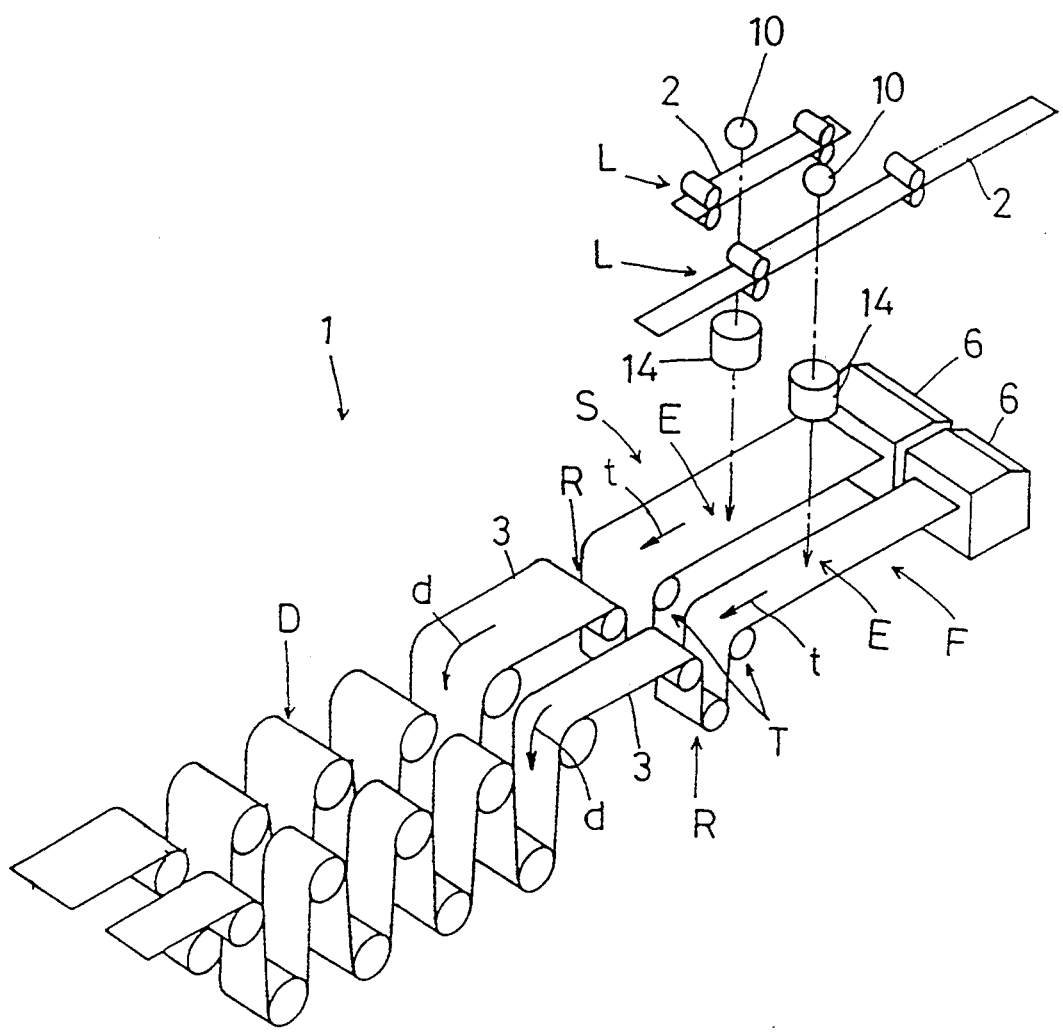
FIG. 8 is a perspective view showing major portions relating to a still further embodiment.

(6) As shown in FIG. 8, it is conceivable to adapt the first exposure unit F and the second exposure unit S to transport print papers 3 having different widths with respect to the transporting direction.

Figure 9:
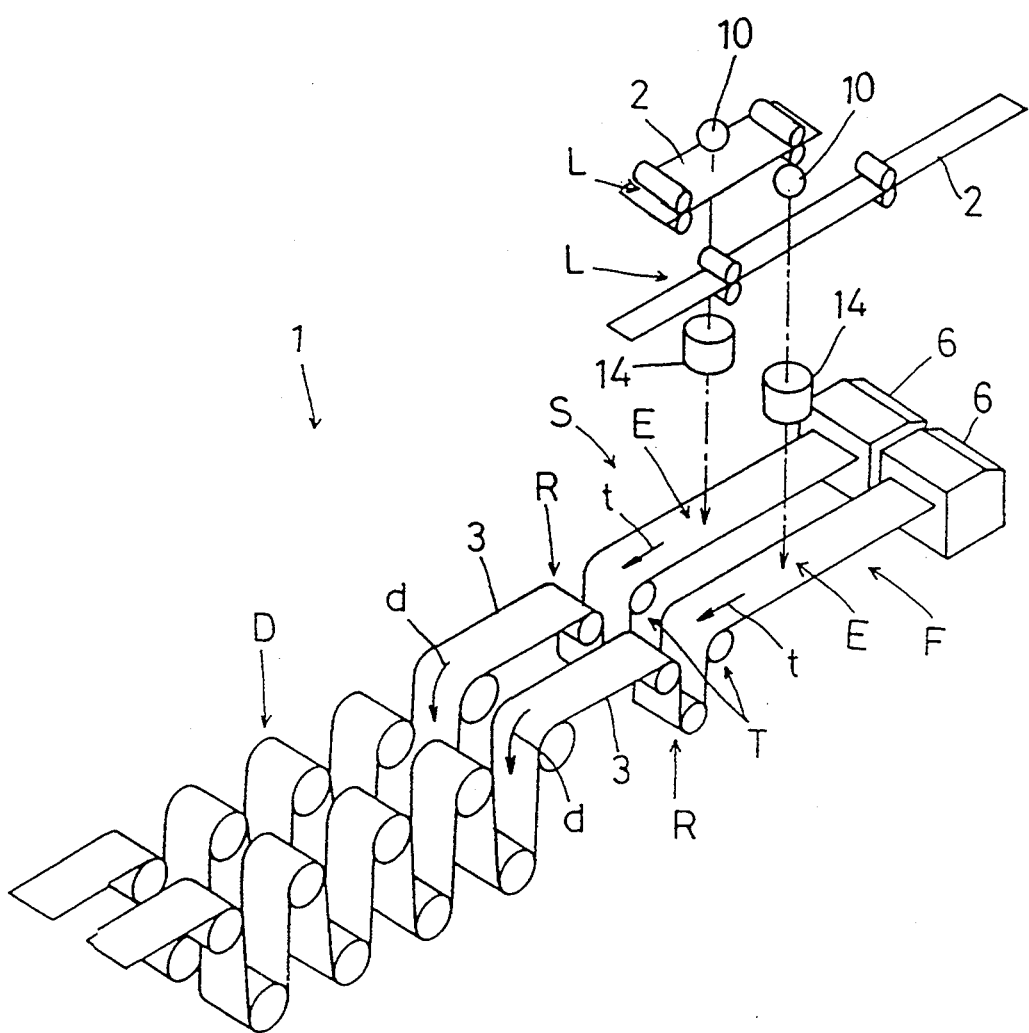
FIG. 9 is a perspective view showing major portions relating to a still further embodiment.

(7) As shown in FIG. 9, it is conceivable to adapt the first exposure unit F and the second exposure unit S to transport print papers 3 having different sizes from each other. Incidentally, in this case, a plurality of processing units, i.e. the transport means T, should preferably be provided in the number corresponding to the number of the kinds of the film 2.

Figure 10:
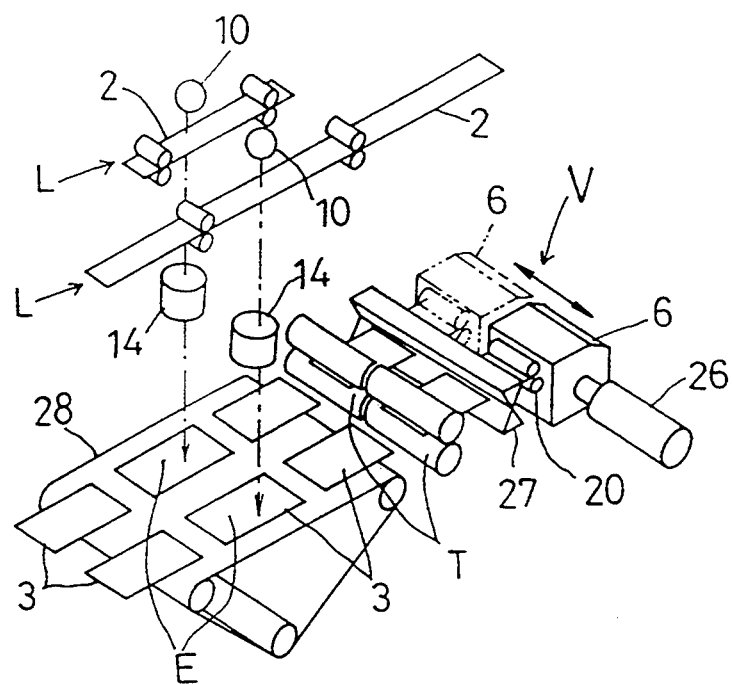
FIG. 10 is a perspective view showing major portions relating to a still further embodiment.
Figure 11:
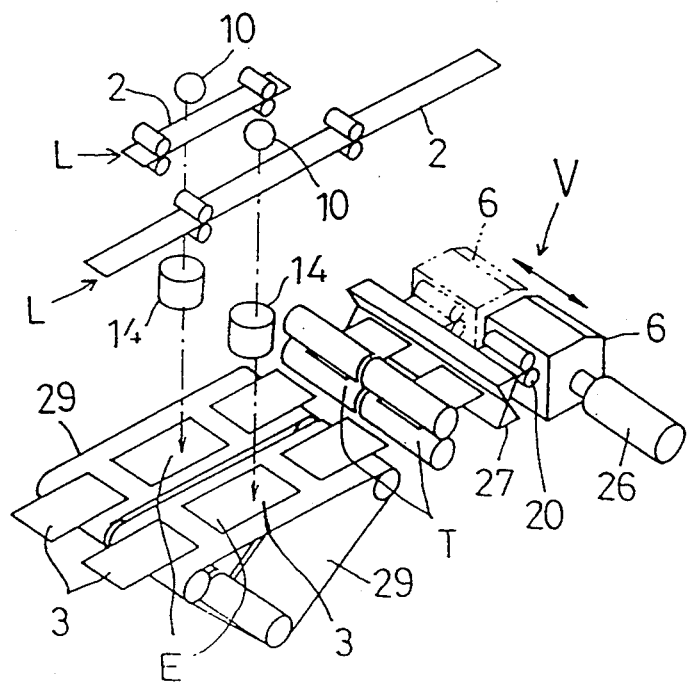
FIG. 11 is a perspective view showing the major portions relating to the embodiment of FIG. 10.

(8) As shown in FIGS. 10 and 11, it is conceivable to provide a cylinder 26 for reciprocating the magazine 6 for accommodating the rolled print paper 3 and a cutter 27, thereby to constitute distributor feeder means V for distributing and feeding the print papers 3 from the single magazine 6 to the two transport means T. Incidentally, in the case of FIG. 10, since the exposing positions E of the two transport means T are formed by the one transport belt 28, it is necessary to effect the activating and stopping operations of the rollers 20 for positioning the print papers 3, in accordance with the operation of the cylinder 26. Of course, in the case of FIG. 11 in which the exposing positions E of the two transport means T are formed by the separate transport belts 29, such positioning operation is not necessary.

(9) A still further embodiment of the present invention will be described next.

Figure 12:
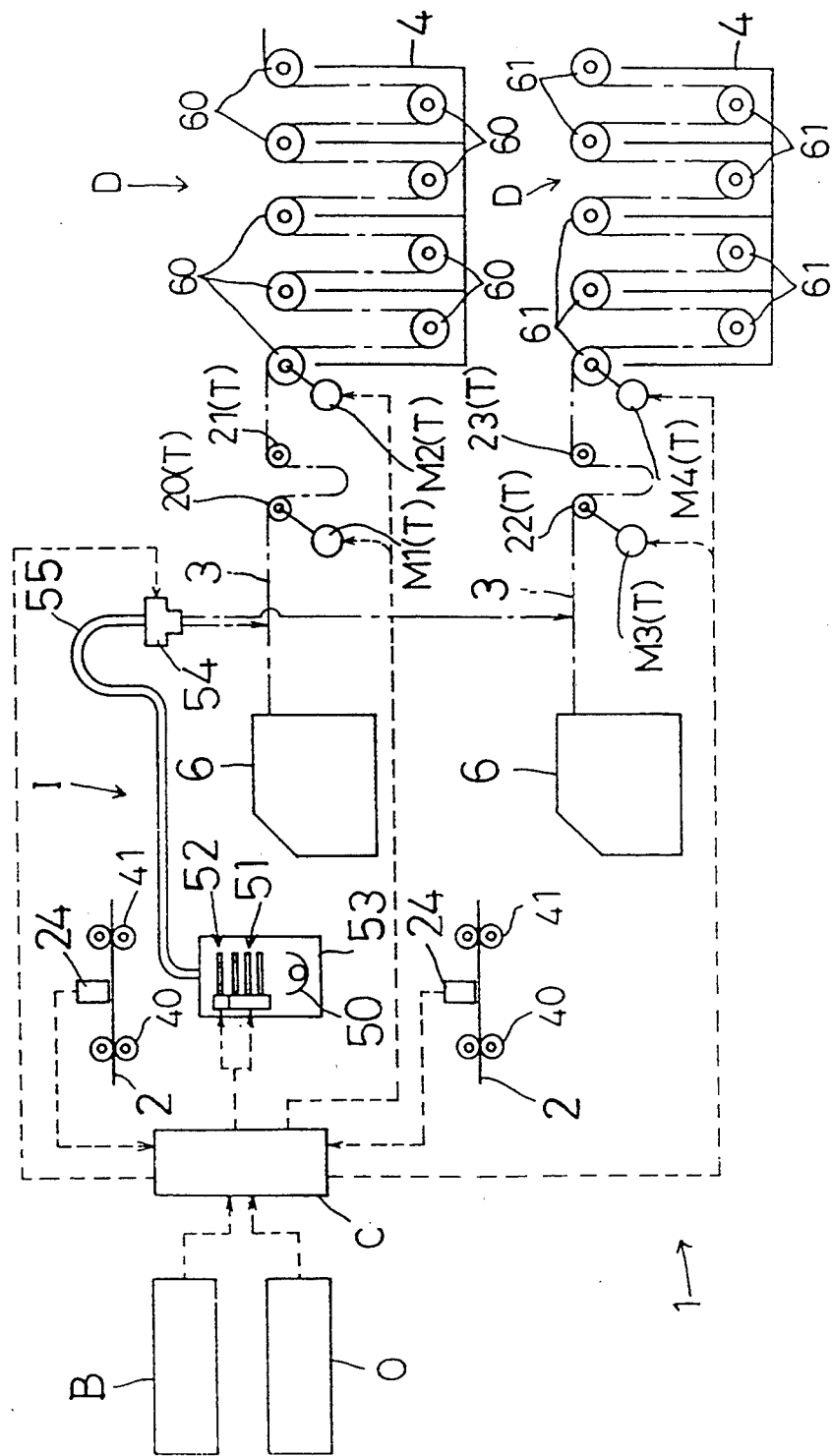
FIG. 12 is a schematic construction view of a still further embodiment.
Figure 14:
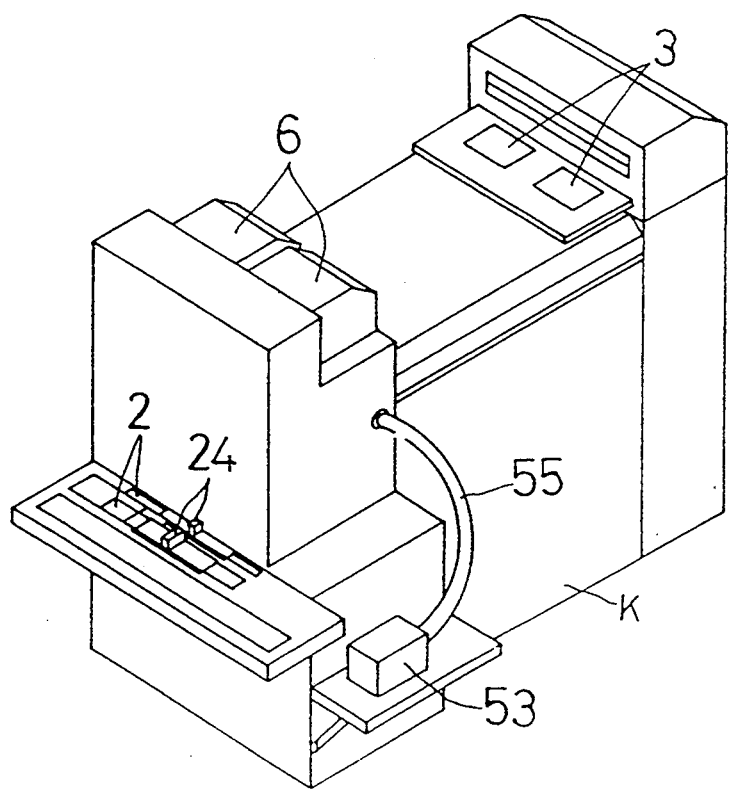
FIG. 14 is a perspective view showing an outer appearance of the embodiment of FIG. 12.

As shown in FIG. 12, an image printer 1 includes transport means T having a construction to be described later and operable to transport print papers 3 as photosensitive materials withdrawn from two magazines 8, an image exposure unit I for exposing the print papers 3 transported by the transport means T, two scanners 24 acting as reader means for reading image information of a film 2 for exposing the print papers 3 at the image exposure unit I, developing units D for developing the print papers 3 exposed by the image exposure unit I, and a controller C for controlling operations of the entire image printer 1. And, these components are housed together in a casing K which appearance is shown in FIG. 14.

Incidentally, the scanners 24 are disposed on a rack portion provided at a longitudinal end of the casing K; and, the two magazines 6 are detachably attached to positions above the disposing positions of the scanners 24.

Figure 13:
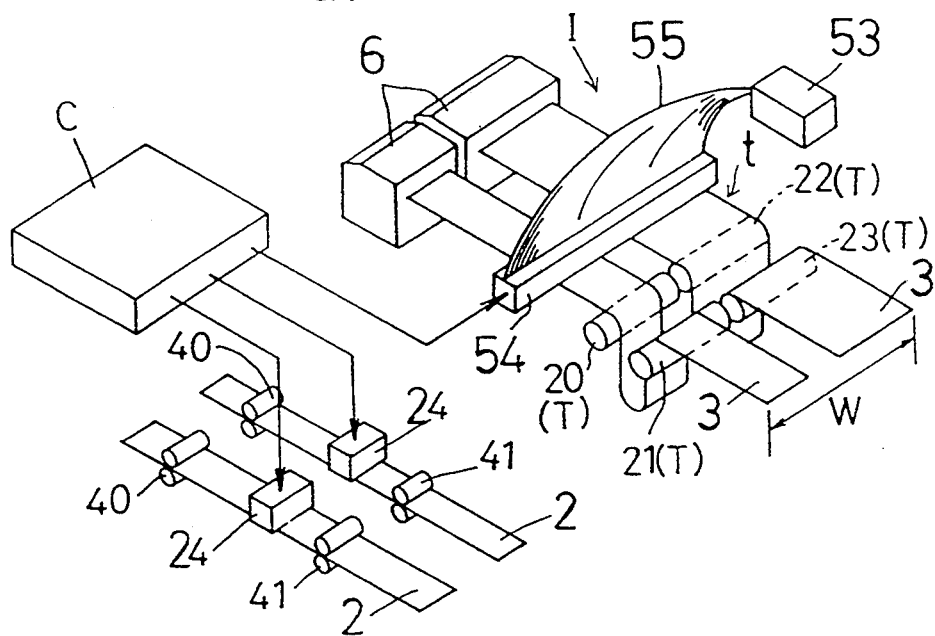
FIG. 13 is a perspective view showing major portions relating to the embodiment of FIG. 12.

The print papers 3 withdrawn from the two magazines 6, as illustrated in FIG. 13, are transported in two lines, with transport passages (t) of the print papers 3 being disposed in parallel to each other in a same plane. And, these print papers 3 transported in the two lines are exposed with the image information of the film 2 read by the two scanners 24; and with completion of the exposures the print papers 3 are developed at the developing units D.

Next, the respective components will be specifically described.

The image exposure unit I includes a light-source unit 53 housing a light source 50, a color filter 51 for obtaining a particular exposing color from the light irradiated from the light source 50, and a shutter 52 within one casing, a PLZT print head 54, an optical fiber bundle 55 for guiding light beam between the light-source unit 53 and the PLZT print head 54. The exposing position of the image exposure unit I is formed where the PLZT print head 54 is facing.

The PLZT print head 54, though not shown, includes a great number of assemblies each having a PLZT interposed between a polarizer and an analyzer, with the assemblies being linearly disposed in the direction perpendicular to the transporting direction of the print paper 3. In operation, by varying a voltage to be impressed between a pair of electrodes attached to each PLZT, the polarizing direction of the light beam passing between the electrodes is changed, so that each PLZT functions as a light shutter for allowing or inhibiting the light passage.

For exposing the print paper 3 in the image exposure unit I, by switching over the color filter 51 of the light-source unit 53, the color of the light irradiated from the light-source unit 53 is switched to one of the three colors of red, blue and green; and with each color the light shutters of the PLZT print head 54 are opened and closed to expose the print paper 3. Since this PLZT print head 54 comprises the linearly arranged light shutters, the print head can expose only one line amount of the image information. Thus, for exposing the entire two-dimensional image information, the exposure is effected while the motor M3 is activated to continuously transport the print paper 3 to the exposing position E3.

The length of the linearly arranged PLZT light shutters is set longer than a width (w) of the print papers 3 transported in parallel to each other with respect to this transporting direction so as to enable exposure of both of the print papers 3.

The opening/closing operations of the respective light shutters of the PLZT print head 54 based may be effected independently of each other by the control of the controller C. For simultaneously exposing two kinds of image information on to the print papers 3 transported in parallel to each other, the image information read by the two scanners 24 are composed by the controller C, considering the position relationship between the parallel-transported print papers 3. Then, by processing this composed image information just like a one-frame amount of image information, the exposure is effected by controlling the opening/closing of the respective light shutters of the PLZT print head 54.

The two scanners 24 are provided respectively for reading image information of two different sizes of films 2, a 135 film which is a standard size film and a 110 film, for instance. Since the basic constructions of these scanners are the same while they differ slightly in size, these scanners will be described together as follows.

The scanner 24, though not shown, includes three CCD line sensors, with the respective line sensors being attached with color filters of the three primary colors, i.e. red, green and blue. Then, the scanner 24 is operable to read the image information as divided into a plurality of areas, with the transmission light from the film 2 being resolved into the above-described three primary color components. Incidentally, since the construction employs the CCD line sensor, this scanner construction is capable of reading only one-line amount of image information when the construction remains still. Hence, for allowing the scanner 24 to read the two-dimensional image information of the film 2, this is done by transporting the film 2 with two rollers 40, 41 driven by an unillustrated motor.

The transport means T, for each of the print papers 3 transported in parallel to each other, includes rollers 20, 21, motors M1, M2, rollers 22, 23 and motors M2, M4. The rollers 20, 21 and the motors M1, M2 are driven independently of the rollers 22, 23 and the motors M3, M4. Yet, these operations are substantially the same. Therefore, only one drive train will be described next.

The disposed roller 20 is rotatably driven by the motor M1 and the disposed roller 21 is rotatably driven by the motor M2.

With activation of the motor M1 for rotatably driving the disposed roller 20, the print paper 3 is withdrawn from the print-paper magazine 6 to reach the exposing position of the image exposure unit I. Then, by repeating, one after another, an exposure operation of one-line amount of image information by the image exposure unit I and a transporting operation of one-line amount of print paper 3 by the transport means T, the two-dimensional image information is exposed onto the print paper 3.

The transporting speed of the print paper 3 on the downstream side of the transport passage relative to the roller 21 depends on the developing processing speed at the developing unit D. And, the transporting speed of the print paper 3 by the roller 20 does not match the transporting speed of the print paper 3 by the roller 21. Then, between the roller 20 and the roller 21, a loop of the print paper 3 is formed, as illustrated in FIGS. 12 and 13, so as to absorb the above-described difference between the transporting speeds.

The developing unit D includes four developing tanks 4 and rollers 60, 61. The roller 60 is connected with the roller 21 through an unillustrated belt to be driven together by the motor M2. The roller 61 is connected with the roller 23 through an unillustrated belt to be driven together by the motor M4.

Although FIG. 12 shows two developing units D, these actually share the same tanks 4 and only the transporting operations of the print papers 3 are effected independently of each other.

The print paper 3 introduced into the developing unit D is transported by the roller 80 or 81 and is developed through its successive passage through the four developing tanks 4 filled with processing liquids.

The controller C is connected to a control panel 0 for inputting instructions for operations of the image printer 1 and an input unit B acting as an interface for allowing input of image information from an outside device such as an image scanner or a computer capable of producing computer graphics. Although the basic function of the image printer I is exposure of image information of the film 2 read by the two scanners 24 on to the print papers 3, it is also possible to expose the print papers 3 with further image information inputted from the abovedescribed outside device in accordance with an instruction from the control panel O.

Figure 15:
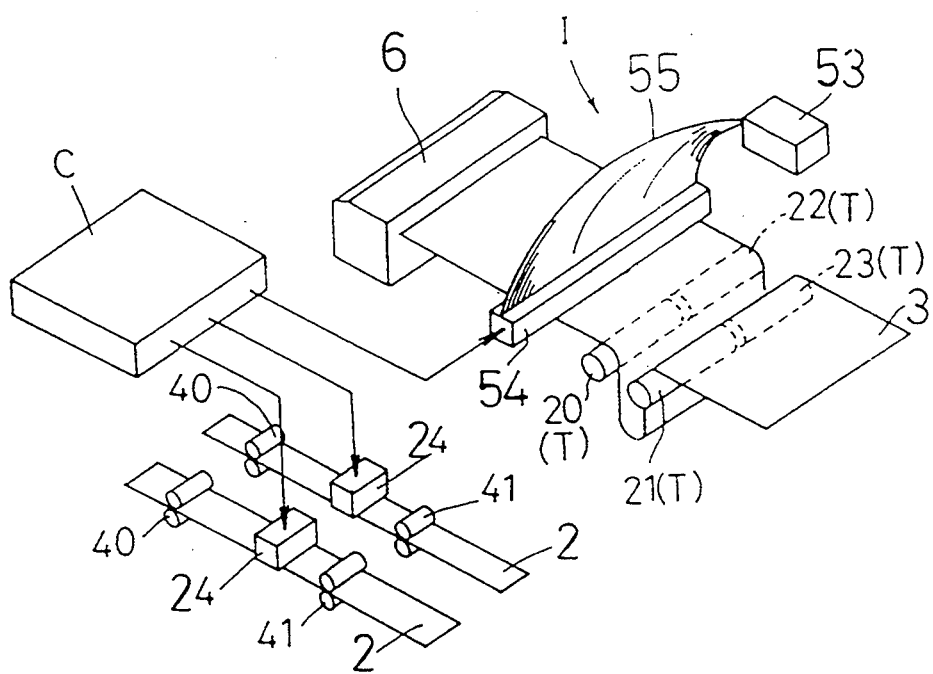
FIG. 15 is a perspective view showing the major portions relating to the embodiment of FIG. 12.

As described hereinbefore, the magazines 8 are detachably attached to the casing K. In FIG. 13, the magazines 8 housing the print papers 3 of different widths are attached. Instead of this, the printer is also capable of effecting exposure operations with attaching the magazines 6 housing the print papers 3 of the same width. Further, as shown in FIG. 15, a further arrangement is conceivable. In this case, one magazine 6 housing a print paper 3 having a wide width is attached to the printer, and the motors M1, M3 and the motors M2, M4 are operated in synchronism with each other so as to transport the wide print paper 3 through the exposing positions by the plurality of transport means T. In this case, an enlarged print too may be produced by exposing one-frame amount of image information of the film 2 by the PLZT print head 54. An instruction for switching over the image printer 1 for producing such enlarged print is provided from the control panel O.

Figure 16:
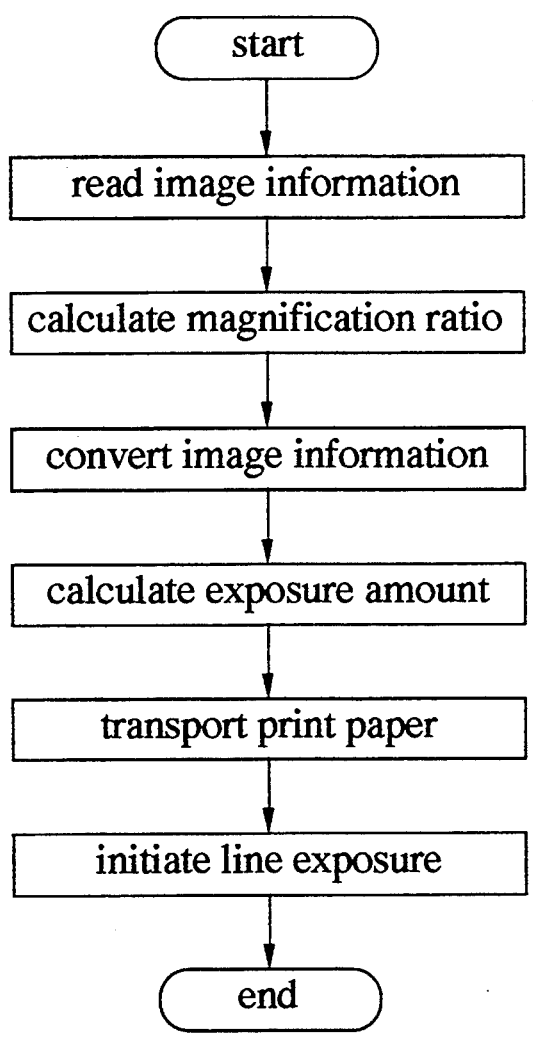
FIG. 16 is a flow chart relating to the embodiment of FIG. 12.

Next, the operations of the image printer 1 having the above-described construction up to the exposure of the print paper 3 will be described with reference to a flow chart of FIG. 16. All the control operations shown in FIG. 16 are effected by the controller C.

First, the images of the films 2 are read by the two scanners 24 (step #1). Then, an exposure magnification ratio is calculated based on the respective sizes of the films 2 and on the size of the print papers 3 presently set (step #2).

With determination of the exposure magnification ratio, the two kinds of image information ready by the two scanners are converted into exposure image information with considerations of such factors as the determined exposure magnification ratio, the position relationship between the print papers 3 transported in parallel to each other (step #3). An exposure amount, i.e. an exposure time period is calculated with each of the plurality of areas together constituting the image information (step #4).

Then, by activating the motors M1, M3, the transportations of the print papers 3 are initiated (step #5). And, a line exposure operation for exposing the image information as divided into a plurality of lines is initiated (step #6).

Each print paper 3 having been exposed in the above-described manner is transported to the developing unit D for its development and then is cut by an unillustrated cutter into a piece containing one-frame amount of image information and then is discharged at an upper portion of the casing K on the opposite side to the attaching position of the print-paper magazine 6.

Figure 17:
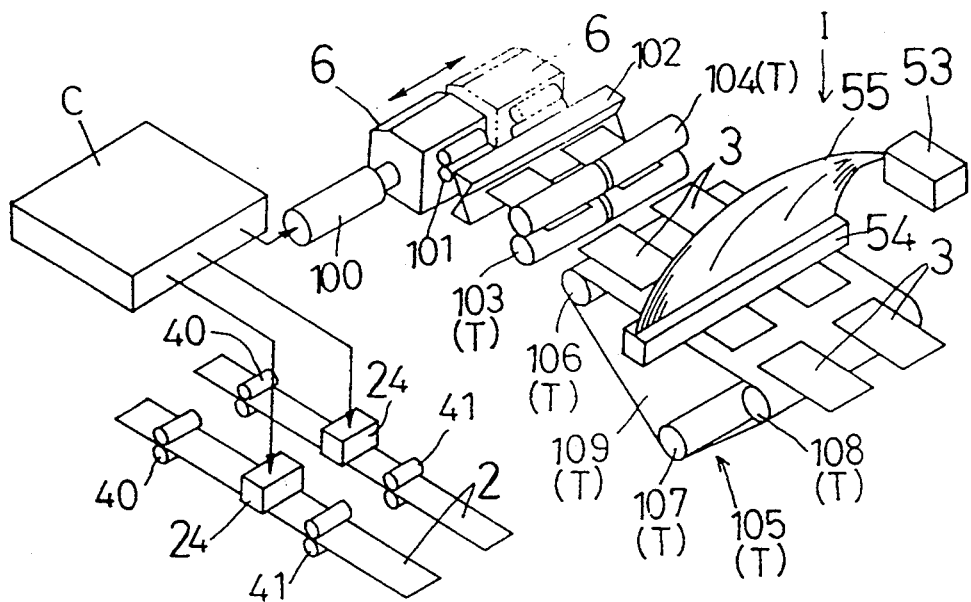
FIG. 17 is a perspective view showing major portions relating to a still further embodiment.

(10) In the above embodiment, the two print papers 3 are withdrawn respectively from the two print-paper magazines 6 for their exposure. Alternately, as shown in FIG. 17, the print papers may be withdrawn from one print-paper magazine 6 to be distributed and fed to two transport means T.

Figure 18:
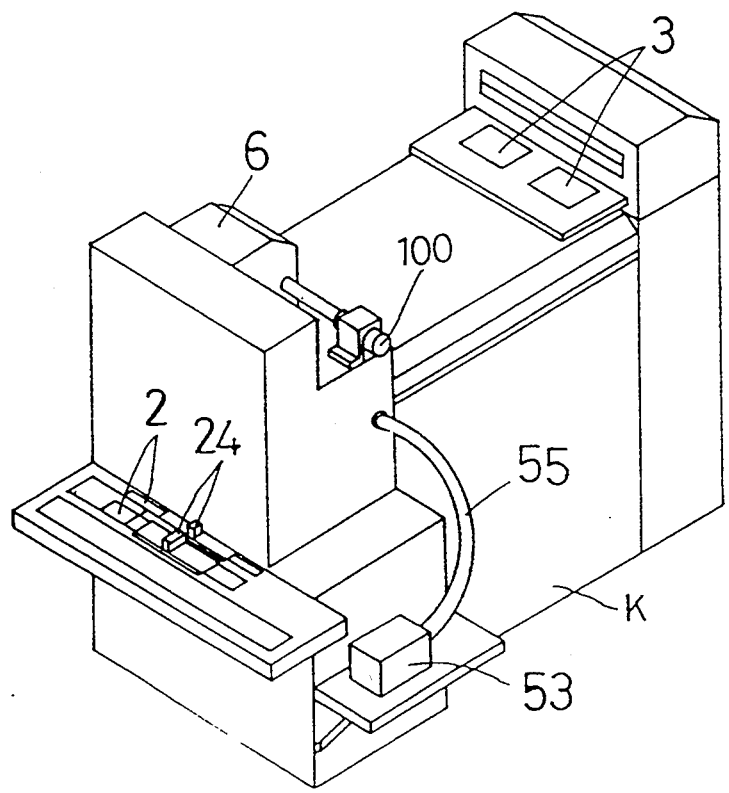
FIG. 18 is a perspective view showing an outer appearance of the embodiment of FIG. 17.

In this case, the print-paper magazine 6 is adapted to be slidable in the direction perpendicular to the transporting direction of the print papers 3 by pushing and pulling actions of an air cylinder 100 acting as distributor feeder means for distributing and feeding the print papers 3 to the two transport means T. That is, the print papers 3 are distributed and fed at a position denoted by a solid line and a further position denoted by an alternate long and short line in FIG. 17. Incidentally, the print-paper magazine 6 and the air cylinder 100 are attached to the casing K in the manners shown in FIG. 18.

The print-paper magazine 6 is attached with rollers 101 for withdrawing the print papers 3 from this print-paper magazine 6 together with an unillustrated motor for rotatably driving the rollers 101.

On the downstream side of the transport passage of the print papers 3 with respect of the magazine 6, there are provided a cutter 102 for cutting the print papers 3 withdrawn from the print-paper magazine 6 and two transport means T for transporting the cut print papers 3 in parallel to each other.

The two transport means T include feed rollers 103, 104 disposed side by side relative to the transporting direction of the print papers 3 and an exposure table 105.

The exposure table 105 includes rollers 106, 107, 108 and a belt 109 entrained about these rollers 106, 107, 108 and is commonly used by the two transport means T. Incidentally, a motor for driving the exposure table 105 is not shown.

Figure 20:
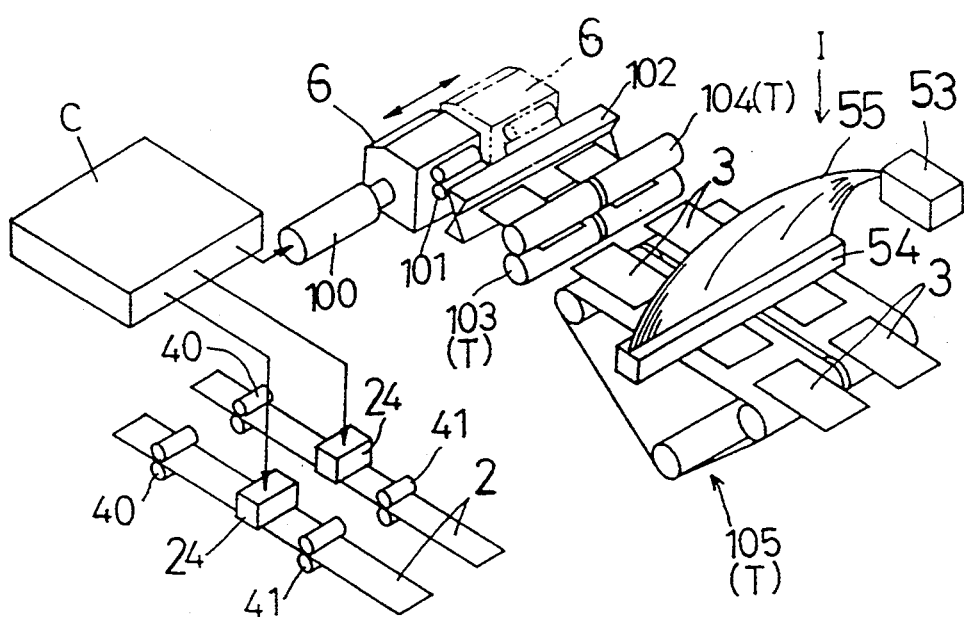
FIG. 20 is a perspective view showing major portions relating to a still further embodiment.

In place of the construction shown in FIG. 17, this exposure table 105 may be constructed as shown in FIG. 20, in which the exposure table 105 is divided along the transporting direction of the print papers 3 to be driven independently for transporting the print papers 3. With this construction, the respective print papers 3 alternately withdrawn in the two lines from the print-paper magazine 6 are aligned in position relative to each other on the exposure table 105 and then these print papers 3 may be exposed simultaneously at the image exposure unit I.

Figure 19:
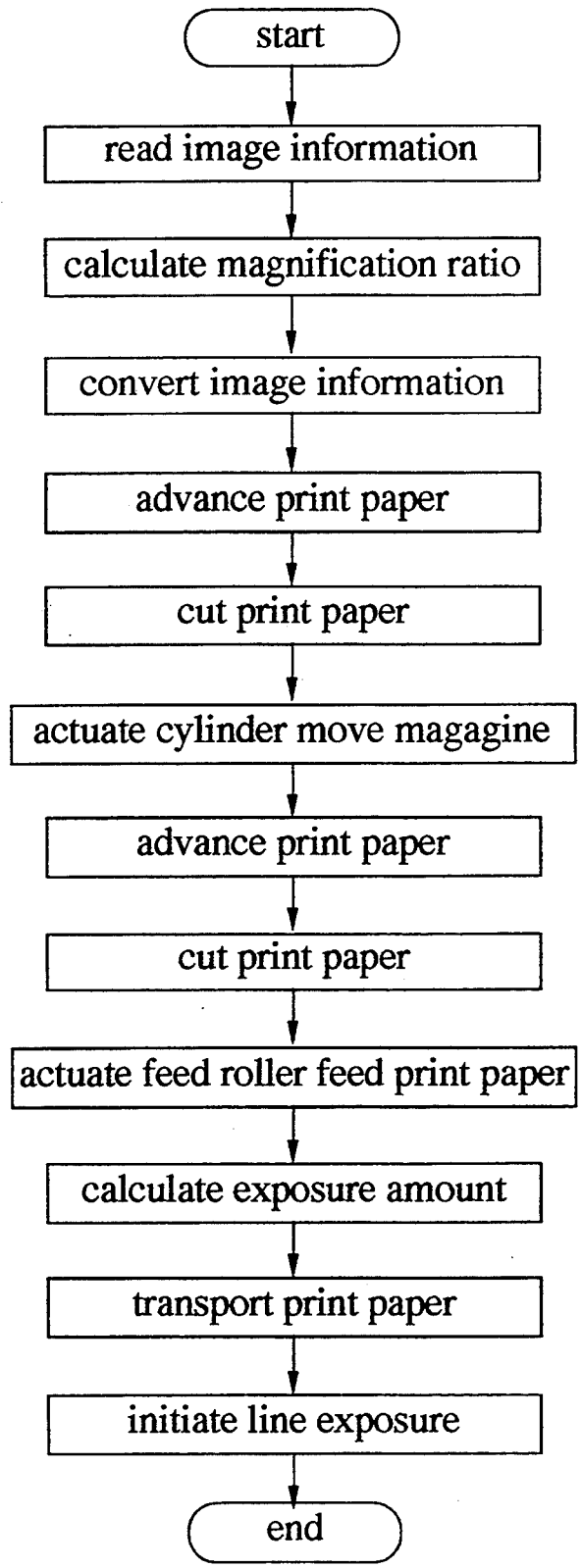
FIG. 19 is a flow chart relating to the embodiment of FIG. 17.

Next, with reference to a flow chart in FIG. 19, there will be described the control operations by the controller C until the exposure of the print papers 3 in case the print papers 3 are distributed and fed to the two transport means T.

First, the images of the films 2 are read by the two scanners 24 (step #1). Then, an exposure magnification ratio is calculated based on the respective sizes of the films 2 and on the size of the print papers 3 presently set (step #2).

With determination of the exposure magnification ratio, the two kinds of image information ready by the two scanners are converted into exposure image information with considerations of such factors as the determined exposure magnification ratio, the position relationship between the print papers 3 transported in parallel to each other (step With the print-paper magazine 8 being located at the position denoted by the solid line in FIG. 17, the withdrawing rollers 101 are rotatably driven to feed the print paper 3 (step #4). After a predetermined amount of the print paper 3 is withdrawn, the print paper 3 is cut (step #5). Thereafter, by activating the air cylinder 100, the magazine 6 is slided to the position denoted by the alternate long and short line in FIG. 17 (step #6). At this position, the withdrawing rollers 101 are rotatably driven to feed the print paper 3 (step #7). After the predetermined amount of feeding, the print paper 3 is cut (step #8).

As described above, when the leading ends of the two print paper 3 are aligned to each other on the downstream side of the transporting passage of the print papers 3 with respect to the feed rollers 103, 104, driving of the feed rollers 103, 104 is initiated (step #9) to advance the print papers to the exposure table 105. Here, an exposure amount, i.e. an exposure time period is calculated with each of the plurality of areas together constituting the image information (step #10). Then, by activating the motors M1, M3, the transportations of the print papers B are initiated (step #11). And, a line exposure operation for exposing the image information as divided into a plurality of lines is initiated (step #12).

Incidentally, in the case of the construction of the exposure table 105 shown in FIG. 20, it is, of course, unnecessary to alien the two print papers 3 on the upstream side of the transport passage of the print papers 3 with respect to the feed rollers 103, 104.

In the above embodiment, two parallel lines of the transport means T are provided. Instead, it is also conceivable to provide more than three parallel lines of the transport means. Further, in the above embodiment, one transport means T includes not more than two exposing positions. Instead, one transport means may include more than three exposing positions.

Further, the printer construction may include only one scanner 24 or more than three of the same.

In the above embodiment, the image exposure unit I employs the PLZT print head 54. Instead, a liquid crystal shutter device may be employed.

A print head comprising a linearly arranged LED chips may be employed as the exposure light source.

In the above embodiment, the print paper 3 is exposed with dividing the image information into a plurality of lines by using the PLZT print head 54 comprised of the linearly arranged light shutters. Alternately, it is conceivable to construct the PLZT print head 54 from a two-dimensional arrangement of the light shutters so as to be able to expose one-frame amount of image information at one time. In this case, the printer may expose the two-dimensional image information as it is on to the print papers 3.

In the above embodiment, the image scanner 24 is comprised of a CCD line sensor. Instead, a CCD or MOS image sensor may be employed.

In the above embodiment, the two kinds of image information read by the two scanners 24 are exposed respectively on to the two print papers 3 transported in parallel with each other. A further construction is conceivable that image information read by one of the two scanners, i.e. the image information of one of the two films 2 is exposed respectively on to the two print papers 3 transported in parallel with each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:
    a developing unit for developing an exposed photosensitive material;
    a plurality of transport means for transporting a photosensitive material to the developing unit through exposing positions provided respectively in a plurality of photosensitive-material transport passages arranged in parallel to each other; and
    a plurality of projection exposure means for exposing a film image on to the photosensitive material, the projection exposure means being provided respectively for the exposing positions of the transport means.

2. An image printer as defined in claim 1, wherein said plurality of the transport means are disposed side by side in the horizontal direction.

3. An image printer as defined in claim 1, wherein said plurality of transport means are disposed one above another in the vertical direction.

4. An image printer as defined in claim 1, wherein at least one of the plurality of the transport means is adapted to transport the photosensitive material through the plurality of exposing positions, and each of the exposing positions is provided with a projection exposure unit for projecting and exposing the film image and with an image projection unit for exposing the film image with this image being divided into a plurality of areas.

5. An image printer as defined in claim 1, wherein said developing unit includes a plurality of transport passages for independently transporting the photosensitive material fed by each of the plurality of transport means.

6. An image printer as defined in claim 5, wherein one of the exposing positions of the plurality of transport means is adapted as an exposure position for a simultaneous printing operation at which the print is received simultaneously with film development while the other exposing position is adapted for a reprinting operation at which the print is received for copy printing or the like.

7. An image printer as defined in claim 5, wherein one of the exposing positions of the plurality of transport means is adapted as an exposure position for a 135 film while the other exposing position is adapted for any other kind of film than the 135 film.

8. An image printer as defined in claim 5, wherein said plurality of transport means are adapted to transport photosensitive materials having different widths in the direction normal to the transporting direction.

9. An image printer as defined in claim 5, wherein only one of the plurality of the transport means is connected with the film developing unit for developing and feeding the film.

10. An image printer as defined in claim 9, wherein said plurality of transport means are adapted to transport photosensitive materials having different widths in the direction normal to the transporting direction.

11. An image printer as defined in claim 5, further comprising:
    a magazine for housing the photosensitive materials; and
    photosensitive-material feed means for feeding and distributing the photosensitive materials housed in the magazine to the plurality of transport means.

12. An image printer comprising:
    a developing unit for developing an exposed photosensitive material;
    a plurality of transport means for transporting a photosensitive material to the developing unit through exposing positions provided respectively in a plurality of photosensitive-material transport passages arranged in parallel to each other within a common plane; and
    an image exposure unit for exposing the photosensitive material with image information as divided into a plurality of areas, said image exposure unit being operable to expose a plurality of photosensitive materials transported by the plurality of transport means.

13. An image printer as defined in claim 12, wherein said image exposure unit is adapted to effect the exposure of the image information with diving the image information into a plurality of lines extending normal to the transporting direction of the photosensitive-material transport passages.

14. An image printer as defined in claim 12, wherein the plurality of transport means are rendered switchable between a state for independently transporting a plurality of photosensitive materials and a further state for together transporting a single photosensitive material.

15. An image printer as defined in claim 12, wherein the plurality of transport means are adapted to transport photosensitive materials having different widths.

16. An image printer as defined in claim 12, further comprising:
    a plurality of reader means for reading the image information to be respectively exposed at the exposing positions of the plurality of transport means.

17. An image printer as defined in claim 12, further comprising:
    a magazine for housing the photosensitive materials; and
    photosensitive-material feed means for feeding and distributing the photosensitive materials housed in the magazine to the plurality of transport means.

18. An image printer as defined in claim 17, further comprising:
    a plurality of reader means for reading the image information to be respectively exposed at the exposing positions of the plurality of transport means.

* * * * *